J. A. HOWE.
THERMOMETER HOLDER.
APPLICATION FILED NOV. 10, 1911.
1,165,973.  Patented Dec. 28, 1915.
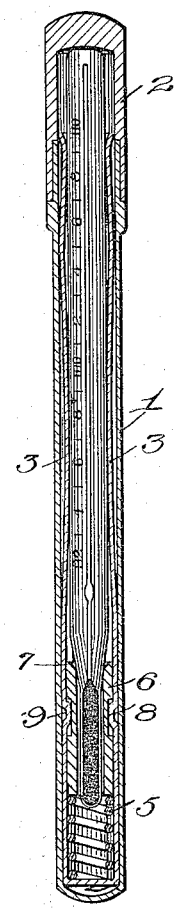
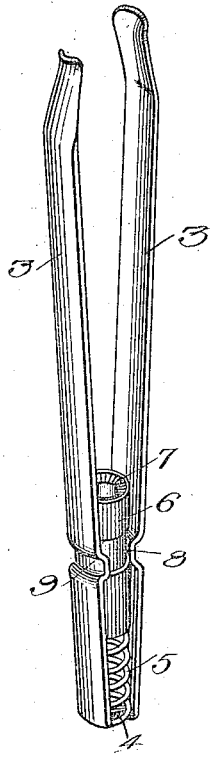
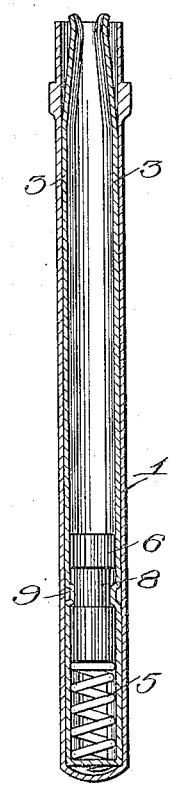
Inventor
James A. Howe,
Witnesses

UNITED STATES PATENT OFFICE.

JAMES A. HOWE, OF ROCHESTER, NEW YORK, ASSIGNOR TO TAYLOR INSTRUMENT COMPANIES, OF ROCHESTER, NEW YORK, A CORPORATION OF NEW YORK.

THERMOMETER-HOLDER.

1,165,973.  Specification of Letters Patent.  Patented Dec. 28, 1915.

Application filed November 10, 1911. Serial No. 659,581.

*To all whom it may concern:*

Be it known that I, JAMES A. HOWE, of Rochester, in the county of Monroe and State of New York, have invented certain new and useful Improvements in Thermometer-Holders; and I do hereby declare the following to be a full, clear, and exact description of the same, reference being had to the accompanying drawings, forming a part of this specification, and to the reference-numerals marked thereon.

The present invention relates to a thermometer holder or case, being in the nature of an improvement upon the device covered in my Patent No. 990,269, April 25, 1911, and it has for its object to provide an improved means for supporting the thermometer more firmly, and in a manner that will obviate any likelihood of its being broken while in the holder.

To these and other ends the invention consists in certain improvements and combinations of parts all as will be hereinafter more fully described, the novel features being pointed out in the claims at the end of the specification.

In the drawings: Figure 1 is a sectional view of a holder embodying the present improvement, and showing a thermometer positioned therein; Fig. 2 is a similar view, with the thermometer and cover of the holder removed, and Fig. 3 is a perspective view of the parts which are adapted to be arranged within the casing, to support the thermometer.

Similar reference numerals throughout the several figures indicate the same parts.

In the embodiment of the invention as herein illustrated, 1 designates the casing, provided with the cap or cover 2, as usual.

Arranged within the casing 1 are the resilient members, or arms 3, these being joined together at their lower ends by the connecting portion 4 and having converging upper ends, all in accordance with the construction shown and described in my previous patent, above referred to.

Arranged between the resilient members 3 is a helically coiled spring 5, the lowermost extremity of which is adapted to engage under the connecting portion 4, the latter being cut away for this purpose, whereby the spring is held in fixed relation to the bottom of the casing.

The spring 5 is arranged to support the container 6, adapted to receive the smaller end of the thermometer, and which is formed of a non-metallic substance, preferably wood, hard rubber, or the like, so that the lower end of the thermometer will not come in contact with metal. The container 6 is preferably in the form of a hollow cylinder, as shown, its upper edge being interiorly beveled at 7 to afford a suitable engaging surface for the thickened or tapered portion of the thermometer above the bulb. The container is arranged between the resilient members 3, and preferably has a limited movement relatively to the latter. To this end, the container is provided with an annular exterior channel 8 arranged to be engaged by coöperating projections 9 formed on the resilient members, and preferably stamped out therefrom.

When the thermometer is placed within the holder, the spring arms are placed under tension and serve to grip it tightly, the lower end being received by the container, as shown in Fig. 1. When the cap or cover is positioned, the thermometer is forced down slightly until the upper edge of the channel on the container engages the projections on the spring arms, limiting any further downward movement and holding the thermometer rigidly within the casing, but with sufficient resiliency to obviate breakage from undue pressure. The container being made of a non-metallic substance, forms a proper receiver for the thermometer, and eliminates any possibility of the glass being broken by contact with a metallic surface at its lower end, as is frequently the case where the thermometer rests directly on a spring or other metallic support.

I claim as my invention:

1. In a thermometer holder, the combination with a casing, of resilient members extending longitudinally of the casing, projections on said members, a container for the end of the thermometer arranged between said members and having an annular channel coöperating with the aforementioned projections, and a helically coiled spring supporting the container.

2. In a thermometer holder, the combination with a casing, of a container for the end of the thermometer having an annular channel, means arranged within the casing and coöperating with said channel to limit the movement of the container, and a resilient support for the container.

3. A holder for a thermometer having a bulb of reduced diameter comprising a casing, a cylindrical container having an opening extending throughout, whereby the lower portion of the body of the thermometer rests upon the upper edge of the container and the bulb of the thermometer is received within said opening with its end free from engagement, the opening in the container being of slightly greater diameter than the bulb of the thermometer, and of less diameter than the body of the thermometer, and a spring arranged beneath the container independently thereof, and constituting a support for the same.

JAMES A. HOWE.

Witnesses:
HERBERT J. WINN,
L. J. MERDLINGER.

Copies of this patent may be obtained for five cents each, by addressing the "Commissioner of Patents, Washington, D. C."